United States Patent [19]

Won et al.

[11] 4,389,247
[45] Jun. 21, 1983

[54] METAL RECOVERY PROCESS

[75] Inventors: Sungkuk Won; Jerry E. Dobson, both of Tucson, Ariz.

[73] Assignee: Standard Oil Company (Indiana), Chicago, Ill.

[21] Appl. No.: 362,956

[22] Filed: Mar. 29, 1982

[51] Int. Cl.³ .............................................. C22B 15/00
[52] U.S. Cl. .......................................... 75/72; 75/62; 75/74; 75/91; 266/171; 266/181
[58] Field of Search .................. 75/91, 74, 72, 73, 62, 75/26, 0.5 B; 266/171, 181, 186, 197, 204

[56] References Cited

U.S. PATENT DOCUMENTS

| 4,023,963 | 5/1977 | Bonnaune | 75/91 |
| 4,039,324 | 8/1977 | Stephens | 75/72 |
| 4,192,676 | 3/1980 | Reynolds | 75/72 |

*Primary Examiner*—L. Dewayne Rutledge
*Assistant Examiner*—Scott Kastler
*Attorney, Agent, or Firm*—James R. Henes; William T. McClain; William H. Magidson

[57] ABSTRACT

A process for recovering a metal in its elemental state from an oxide or salt of the metal comprising passing the metal oxide or salt and a reducing gas concurrently downward through a packed bed at a temperature above the melting point of the metal in its elemental state.

20 Claims, 2 Drawing Figures

METAL RECOVERY PROCESS

BACKGROUND OF THE INVENTION

1. Field of the Invention

This invention relates generally to a process for recovering a metal in its elemental state from an oxide or salt of the metal by reacting the metal oxide or salt with a reducing gas and more particularly concerns a process for efficiently recovering a metal in its elemental state from an oxide or salt of the metal comprising passing the metal oxide or salt and reducing gas concurrently downward through a packed bed at a temperature above the melting point of the metal in its elemental state.

2. Description of the Prior Art

The recovery of a metal in its elemental state by the reaction of an oxide or salt of the metal with a reducing gas is well known in the art. A common technique for reducing a metal in its oxide or salt to its elemental state by reaction of the metal oxide or salt with a reducing gas is to perform the reduction in a fluidized bed at temperatures below the melting point of the elemental metal. However, a detrimental phenomenon that has been observed in the reduction of a metal to its elemental state in a fluidized bed at temperatures below the melting point of the elemental metal, is the tendency of the elemental metal to sinter and agglomerate, resulting in disruption of the fluidized state of the bed.

Stephens et al., U.S. Pat. No. 4,039,324 disclose a technique for the hydrogen reduction of copper in its oxide or salt to its elemental state, in a fluidized bed reactor, which circumvents the problem of sintering or agglomeration by employing a bed temperature of from about 200° C. to about 1000° C. and substantially chemically inert and generally spherical, relatively smooth, non-porous particles in the bed. Although agglomeration of the elemental copper to such a degree that defluidization of the bed occurs is prevented, the formation of the elemental copper in solid form necessitates a certain degree of agglomeration during which some bed particles are incorporated into particles containing the elemental copper and act as impurities therein. The resulting solid elemental copper is produced in the form of particles containing bed particles as well as copper. Upon completion of the fluidized bed reduction, the composite particles are removed from the reactor and further processed in order to separate the bed particles from the elemental-copper-containing particles. Thus this technique involves additional solids handling and separation aspects. Furthermore, Stephens et al. point out that, when the temperature at which the reduction is carried out exceeds 600° C., copper is produced in the form of fines which are difficult to handle and separate from the fluidizing gas.

A technique which totally eliminates the problem of sintering and agglomeration and results in the production of an elemental metal in a highly pure state is disclosed in Reynolds et al., U.S. Pat. No. 4,192,676, and involves hydrogen reduction of a copper-bearing material at a temperature greater than the melting point of elemental copper under conditions which result in substantially instantaneous reduction coupled with efficient collection of the resulting elemental copper. Reynolds et al. point out that the resulting reduced copper particles are generally of the near sub-micron size and in liquid form and that collection of such particles is preferably accomplished as much as possible within the reactor. The preferred technique disclosed to effect the reduction and collection is the utilization of a cyclone flow pattern within the reactor. Such technique permits the small elemental copper particles to collect and coalesce into sufficiently large liquid particles in order to facilitate the copper recovery. Reynolds et al. disclose that other collection techniques that may be employed in lieu of or in combination with this cyclone technique include gravity settling in large chambers, wet scrubbing with collection of the copper as a powder cake, fabric filtering, and other known fine particle collection techniques.

Experience with the technique of Reynolds et al. indicates that efficient recovery of the resulting elemental copper often necessitates supplementing the collection of copper within the reactor with scrubbing of the off gases to collect the copper fines escaping from the reactor in the off gases. Furthermore, in the method of Reynolds et al., the copper oxide or salt must be introduced into the reactor in the form of a solid having a relatively small particle size. Thus, when dealing with feed components having a melting point less than the reaction temperature, it would be necessary in the method of Reynolds et al. to employ a technique which would maintain the feed in solid form until it is within the reaction vessel.

Other disadvantages of such prior art techniques are that fluidization and feeding a cyclone require high velocities and volumes of gas and that a great deal of energy is required to recycle the large volumes of gas because the fluidizing gas is generally cooled and then reheated in the recycling process.

OBJECTS OF THE INVENTION

It is, therefore, a general object of the present invention to provide an improved process which overcomes the aforesaid limitations of the prior art techniques.

More particularly, it is an object of the present invention to provide an improved process for recovering an elemental metal by reduction of an oxide or salt of the metal with a reducing gas in a packed bed of substantially inert packing material which eliminates the problem of sintering or agglomeration of the resulting elemental metal particles in the bed.

It is another object of the present invention to provide an improved process for recovering an elemental metal by reduction of an oxide or salt of the metal with a reducing gas in a packed bed of substantially inert packing material which minimizes solids handling and separation problems.

It is another object of the present invention to provide an improved process for recovering an elemental metal by reduction of an oxide or salt of the metal with a reducing gas in a reactor containing a bed of packing material which reduces the requirements for high gas velocities and volumes and high energy consumption.

It is a further object of the present invention to provide an improved process for recovering an elemental metal by reduction of an oxide or salt of the metal with a reducing gas in a packed bed reactor at a temperature above the melting point of the elemental metal which maximizes recovery of the resulting liquid elemental metal within the reactor.

It is also an object of the present invention to provide an improved process for recovering an elemental metal by reduction of an oxide or salt of the metal with a reducing gas at a temperature above the melting point of the elemental metal, which permits introduction of the oxide or salt into the reduction reactor in any form.

It is an additional object of the present invention to provide an improved process for recovering an elemental metal from an oxide or salt of the metal which permits recovery of the elemental metal in a highly purified form.

Other objects and advantages of the invention will become apparent upon reading the following detailed description and appended claims and upon reference to the accompanying figures.

SUMMARY OF THE INVENTION

These objects are achieved by an improved process for recovering a metal in its elemental state by reducing an oxide or salt of the metal with a reducing gas, comprising: providing a reaction vessel containing a packed bed of a packing material which is substantially chemically inert under the conditions in the reaction vessel and whose melting point is higher than the temperature at which the packed bed is maintained, the packing material being packed so as to provide void spaces in the bed through which fluid flow of the oxide or salt, reducing gas and any elemental metal formed through the bed and in intimate contact with the packing material is permitted; maintaining the temperature of the packed bed above the melting point of the metal in its elemental state and at a level at which substantial reduction of the metal in its oxide or salt occurs by reaction of the oxide or salt with the reducing gas; introducing the metal oxide or salt and the reducing gas into the reaction vessel wherein the metal oxide or salt and reducing gas react to form the metal in its elemental state and passing a reaction mixture comprising any elemental metal formed, any gaseous product formed, any unreacted reducing gas and any unreacted fluid metal oxide or salt downward through the void spaces within the packed bed so as to effect intimate contact between the unreacted fluid metal oxide or salt, the unreacted reducing gas and the packed bed to thereby promote heat transfer therebetween and reaction of the unreacted fluid metal oxide or salt with the unreacted reducing gas, and so as to effect intimate contact of the elemental metal formed and the packed bed to thereby promote coalescence within the packed bed of the elemental metal formed; permitting the reaction mixture to remain within the packed bed sufficiently long that reaction between the metal oxide or salt and the reducing gas and coalescence of the elemental metal formed are substantially complete by the time the reaction mixture passes out of the packed bed; and collecting within the reaction vessel and below the packed bed any coalesced elemental metal passing out of the packed bed.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

Figure 1:
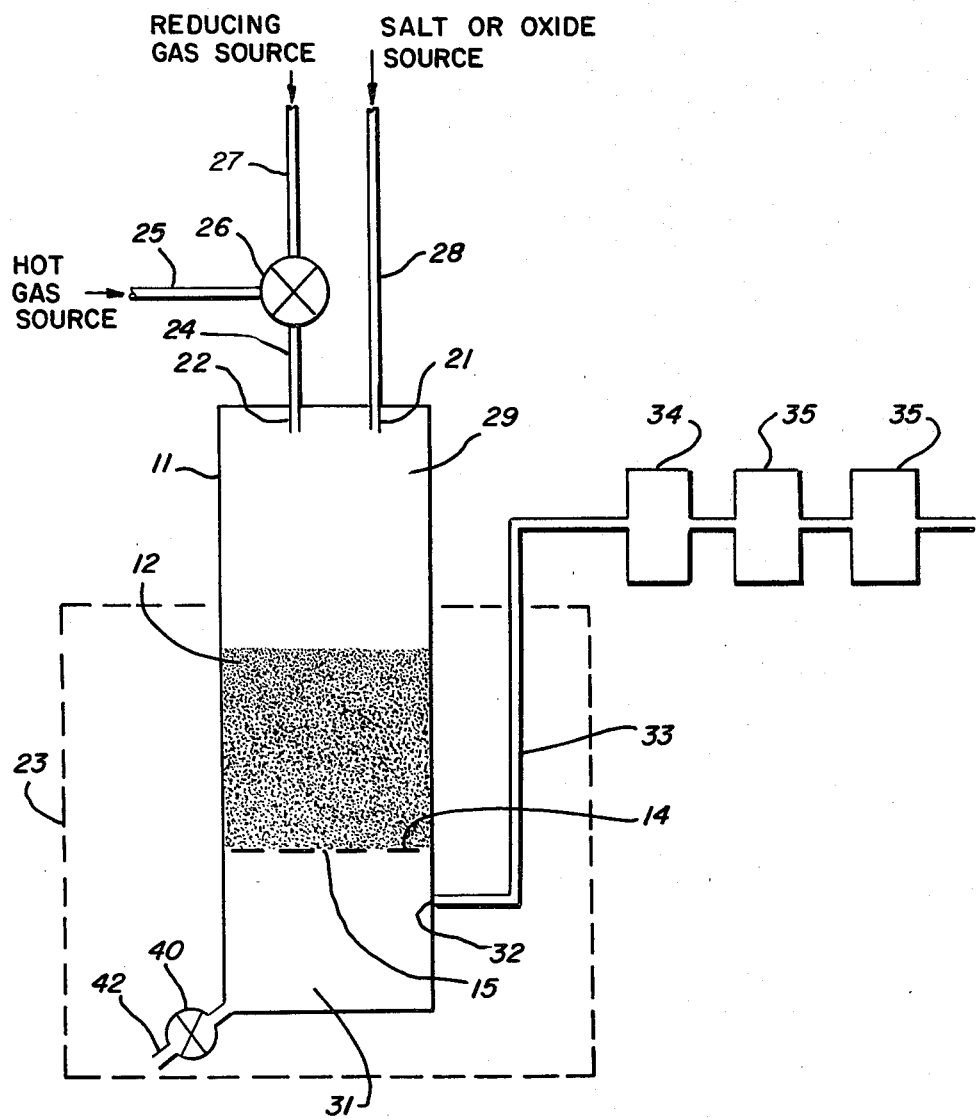
FIG. 1 is a schematic representation of a hydrogen reduction system in which an oxide or salt of the metal to be reduced and a reducing gas are introduced separately into a void volume in a reactor and above a packed bed of substantially inert packing material therein and flow concurrently downward through the packed bed wherein they react to form the metal in its elemental state in the form of liquid fines and wherein the liquid metal fines coalesce to a collectible liquid and upon passage of the reaction mixture from the bottom of the packed bed, the coalesced liquid is collected in the reactor while a gas stream containing uncoalesced fines is passed to a filter and scrubber.

It should be understood that the drawings are not to scale and that the embodiments are illustrated by graphic symbols and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

The process of the present invention involves reduction of a metal in its oxide or salt to its elemental state and can be employed to recover in its elemental state any of the following metals from its oxide or salt: copper, antimony, bismuth, mercury, cobalt, lead, nickel, silver, tin, cadmium and sulfur. Preferably the metal is copper. Suitable salts include a halide, sulfide, sulfate, carbonate and nitrate. Preferably, the salt is a halide. More preferably, copper is recovered from cupric or cuprous chloride, cupric or cuprous oxychloride or cupric or cuprous oxide.

The metal oxide or salt introduced in the method of the present invention can be in solid, liquid or gaseous form. If the metal oxide or salt is introduced in the form of solid particles, the smaller the oxide or salt particles the relatively shorter is the time required to convert the oxide or salt to a fluid form in which it can be passed through the packed bed. Consequently, relatively smaller particle sizes are preferred.

The metal in its oxide or salt is reduced to its elemental state by contacting the oxide or salt with a reducing gas under reducing conditions. Suitable reducing gases include hydrogen, methane, carbon monoxide and ammonia. Preferably, hydrogen is the reducing gas. The ratio of the amount of reducing gas to the amount of metal oxide or salt employed in the process of the present invention depends on the particular metal ion being reduced and the desired reduction reaction. Preferably, the reducing gas is employed in at least the stoichiometric amount required for the complete reduction of the metal in the oxide or salt to its elemental state. More preferably an excess, and most preferably only a small excess, of reducing gas is employed in order to insure the complete reduction of the metal oxide or salt to its elemental state.

Any convenient reduction reactor comprising a suitable packed bed of suitable substantially inert packing material can be used in the method of this invention. In order to effect substantially complete reduction of the metal in the oxide or salt to its elemental state and substantially complete coalescence of the resulting liquid elemental metal fines to a liquid form which is collectible within a desired residence time within the reduction reactor, the flow conditions within the packed bed must be such as to effect rapid and intimate contact between the oxide or salt and the reducing gas therein and whatever heat transfer to the oxide or salt is necessary for the reduction reaction, as well as to effect coalescence of the resulting elemental metal fines, all within the packed bed. Any packed bed and any packig material which afford the aforesaid flow conditions are suitable for use in the method of this invention.

A suitable packed bed has void spaces or channels through which the reaction mixture comprising unreacted metal oxide or salt, unreacted reducing gas and any products of the reaction therebetween flows downward in the packed bed and also has interior surfaces which act as walls of the void spaces or channels. The flow of the reaction mixture in the void spaces or channels is such as to enhance mass transfer of the metal oxide or salt and reducing gas and intimate contact between unreacted metal oxide or salt, unreacted reducing gas and the walls of the aforesaid void spaces, and to thereby promote heat transfer therebetween and reaction of the unreacted metal oxide or salt with the unreacted reducing gas. The flow pattern through the packed bed is also such as to enhance mass transfer of the liquid elemental metal fines produced to the aforesaid walls of the void spaces where coalescence of the fines to a liquid form which is collectible within the reaction vessel is promoted.

In designing a packed bed and selecting a packing material for use in the method of this invention, it is highly desirable that the surface area of the aforesaid walls of the void spaces within the packed bed that is accessible to the reaction mixture is sufficiently high to enhance the capacity of the packing material to transfer heat to the unreacted metal oxide or salt and the unreacted reducing gas in the reaction mixture and to promote coalescence of the resulting elemental metal liquid fines. Moreover, it is essential that the residence time of the reaction mixture in the bed is sufficiently long to allow enough time for the aforesaid reduction and coalescence to be substantially completed within the bed. At the same time, practical considerations make it desirable to maintain sufficiently high rates of flow of the reaction mixture through the packed bed so that the residence time of the reaction mixture in the reduction reactor is not undesirably long. Reasonably high flow rates of the reaction mixture through the packed bed can be maintained either by maintaining relatively large void spaces or channels through which the reaction mixture may pass in the packed bed or by supplementing the pressure differential across the length of the packed bed in order to speed up the flow rate of the reaction mixture through the packed bed.

In some instances, the magnitude of the surface area of the interior walls of the void spaces within the packed bed that is accessible to the reaction mixture and the magnitude of the void spaces within the packed bed—that is, the cross-sectional dimensions of the channels through the bed—can represent conflicting factors. For example, when a particulate material is employed as the packing material, the capacity of a particulate packing material to achieve the aforesaid functions in the packed bed is directly related to the accessible interior surface area and inversely related to its particle size, but when very small particles are employed as the packing material in the packed bed, a greater supplemental pressure differential between the ends of the packed bed may be necessary to achieve a reasonable rate of passage of the reaction mixture through the packed bed than if relatively larger particles are employed as the packing material in the packed bed. As will be discussed further hereinafter, the residence time of the reaction mixture within the packed bed can also be varied by altering the length of the packed bed or the space velocity of the metal oxide or salt through the packed bed (as measured by the weight of the oxide or salt per cubic centimeter of packed volume within the packed bed per hour) or both.

It is essential that the packing material be substantially inert toward the metal oxide or salt and reducing gas employed, to the resulting elemental metal and to the reduction conditions employed in the reduction reactor. Competing or adverse chemical reactions involving the packing material would be detrimental to the process of this invention, would consume the packing material necessary to maintain the packed bed and may contaminate the resulting elemental metal. The packing material must, of course, also have a melting point in excess of the temperature employed in the reduction reactor.

Apart from these requirements, the composition, size, shape or porosity of the packing material and the packing technique employed are immaterial so long as the packed bed performs the functions described hereinabove. Suitable materials for use as the packing material include quartz, ceramic materials, alumina, graphite and refractory metals. Such materials are chemically inert to the reduction processes, have a high melting point and are readily available in naturally occurring materials. Suitable forms for the packing material include integral or interconnected materials such as screens, mesh or twisted lines or wires packed into the reduction reactor as well as separate materials such as particles or cylinders packed into the reduction reactor. Surface characteristics of the packing materials, such as imperfections like cracks, sharp edges, indentations, ridges, random chips, pockets, scars, cavities and the like, are immaterial.

In the method of the present invention, sintering or agglomeration of the elemental metal produced therein is totally avoided by maintaining the temperature of the packed bed above the melting point of the elemental metal. The melting points of all of the elemental metals that can be formed by the method of the present invention are at a level where reduction of the metals in their oxides or salts to their elemental states by the reducing gas occurs rapidly and with high conversions. By maintaining the temperature of the packed bed above the melting point of the particular elemental metal, the elemental metal does not solidify until after it has passed entirely out of the packed bed.

Recognizing that if a void space exists between the top of the packed bed and the top of the reduction reactor, that if the metal oxide or salt is introduced into this void space, and that if the temperature of the void space is not also maintained at least at the melting point of the elemental metal, temperature gradients may be such that elemental metal may be formed and solidified in the injection tube for delivery of the metal oxide or salt into the reduction reactor. In such case, it is highly desirable to control the temperature of such injection tube at a level either where the aforesaid reduction reaction does not occur appreciably or where any elemental metal formed will be in the fluid state, and preferably to introduce the metal oxide or salt and the reducing gas through separate injection tubes and to minimize the likelihood of diffusion or convection of the reducing gas into the injection tube for the metal oxide or salt.

Figure 2:
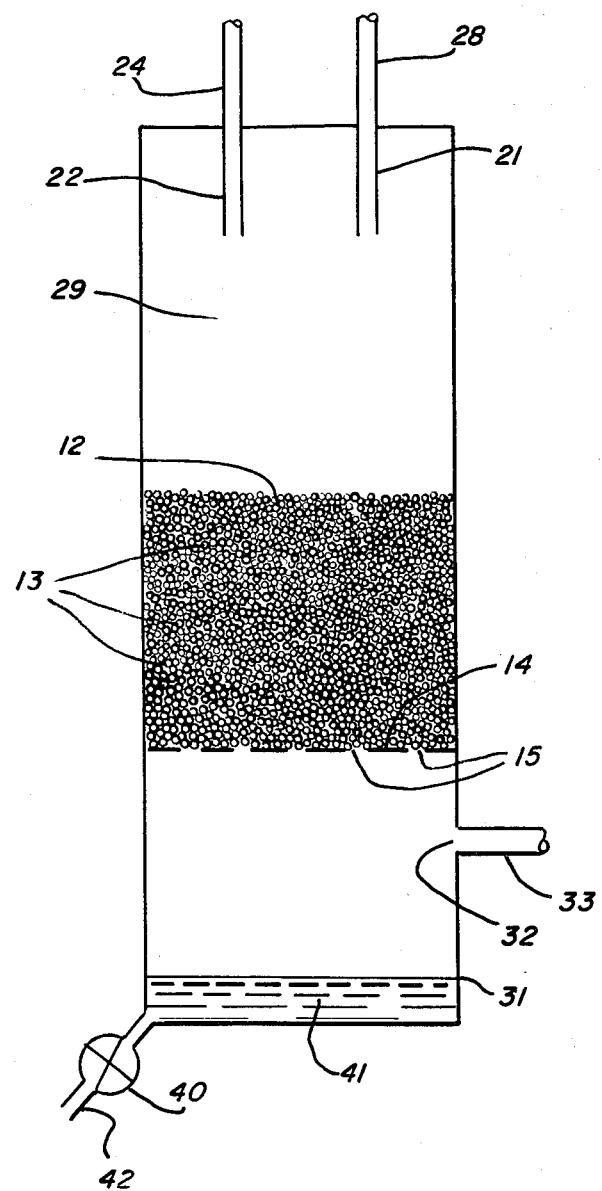
FIG. 2 is a schematic illustration of an embodiment of the packed bed reactor of FIG. 1 in which the packing material comprises particles.

One embodiment of a system and apparatus for practicing the method of the present invention is illustrated schematically in FIGS. 1 and 2. Referring to FIGS. 1 and 2 together, an elongated reduction reactor 11 is employed which contains a packed bed 12 of any suitable packing material. In the embodiment shown in FIG. 2, quartz beads 13 are employed as the packing material. The packed bed 12 is supported on a perforated plate 14 of a substantially inert material having a melting point above the temperature employed in the reduction reactor. The perforations 15 in the plate 14 are sufficiently small to prevent the packing material from passing therethrough and sufficiently large to permit the excess reducing gas and any gaseous products of the reduction reaction as well as the liquid elemental metal produced in the reduction reaction to pass therethrough readily. Although shown as only partially filling the space above the plate 14 in the reduction reactor 11 in the embodiments of FIGS. 1 and 2, the packed bed 12 may fill the entire space within the reactor 11 above the plate 14.

The metal oxide or salt is introduced into the reduction reactor 11 through the injection tube 21. The oxide or salt can be introduced as a solid, liquid or gas. Depending upon the form in which the oxide or salt is introduced into the reactor 11, various convenient and conventional means (not shown) can be employed to feed the oxide or salt to and through the injection tube 21. For example, if the oxide or salt is introduced into the reactor 11 as a solid, a screw feeder can be employed to feed the solid into and through the injection tube 21. In the alternative, particles of the solid can simply be dropped through the injection tube 21 or can be entrained in a stream of at least one of the aforesaid carrier gases or at least one of the aforesaid reducing gases or a mixture thereof and fed in the stream through the injection tube 21. If the oxide or salt is introduced into the reactor 11 as a liquid, it can simply be dropped through the injection tube 21 with the force of gravity or can be forced therethrough by the application of a supplemental force thereon. In addition, droplets of the liquid can be entrained in a stream of at least one of the aforesaid carrier gases or at least one of the aforesaid reducing gases or a mixture thereof and fed in the stream through the injection tube 21. In the alternative, the oxide or salt can be introduced into the reactor 11 as a gas alone or in admixture with at least one of the aforesaid carrier gases or at least one of the aforesaid reducing gases or a mixture thereof.

While the oxide or salt and reducing gas are shown in FIGS. 1 and 2 as both being introduced into the reactor 11 above the packed bed 12 but through separate injection tubes 21 and 22, respectively, the oxide or salt and reducing gas can be introduced in any convenient manner, for example, together through the same injection tube and/or both directly into the packed bed 12 or one into the packed bed 12 and the other above it.

In operation, the packed bed 12 is first heated to the desired temperature. The heating operation can be achieved in any convenient manner, for example, by a furnace 23 surrounding at least the packed bed 12 segment of the reactor 11 or by passing a hot gas through the bed 12 until the temperature of the bed 12 reaches the desired temperature, or any combination of those or similar methods. In the embodiment of FIGS. 1 and 2, the heating is effected both by the heater 23 and by passing a hot gas, for example, an inert gas such as nitrogen, or alternatively a reducing gas, through lines 24 and 25 and injection tube 22 into the reactor 11, and when the packed bed 12 reaches the desired temperature, the valve 26 is turned so that the hot gas flowing through the line 24 and injection tube 22 is replaced by a reducing gas such as hydrogen fed through line 27. It must of course be recognized that separate inlets could be used for the heating gas and the reducing gas and after the desired packed bed temperature is reached, the flow of the heating gas could be continued concurrently with the flow of the reducing gas.

Shortly after introducing the reducing gas into the reactor 11, the oxide or salt is introduced through the line 28 and injection tube 21 into the reactor 11. The oxide or salt and reducing gas come into contact and can react immediately as the oxide or salt exits the injection tube 21 into the reactor 11. Due to temperature gradients within the reactor 11, the temperature of the void space 29 above the packed bed 12 can be considerably less than the bed temperature, and in such case the rate and extent of the reduction reaction would be considerably less in the void space 29 than in the packed bed 12. The reaction mixture entering the packed bed 12 comprises any elemental metal formed in the void space 29 and any other products formed therein as well as unreacted metal oxide or salt and reducing gas. In flowing downward through the packed bed 12, the reaction mixture is forced to flow in a turbulent path through the voids in the packed bed. The turbulent action in the packed bed enhances the reduction reaction by increasing mass transfer of the oxide or salt and the reducing gas to each other and to the exposed interior surfaces of the packed bed 12 whereat heat transfer takes place rapidly. The turbulent action in the packed bed also increases mass transfer of the elemental metal product to the accessible interior surfaces of the packed bed 12 where the elemental metal liquid fines—which may be in the sub-micron or near sub-micron range—coalesce to a collectible liquid form. Upon exiting from the packed bed 12 and with the valve 40 closed, the reaction mixture passes through the perforated plate 14, and the coalesced liquid elemental metal falls into the reservoir 31, and the gaseous components of the reaction mixture including gaseous reaction products, uncoalesced elemental metal fines and excess reducing gas, pass through outlet 32 and exit tube 33, through the filter 34 where flue dusts are removed from the gas stream and through the scrubbers 35 where soluble gaseous reaction products are retained.

Molten elemental metal collects in the reservoir 31 and is shown in FIG. 2 by the shaded area 41. When the valve 40 is opened, the collected molten metal flows through the tube 42 and into a secondary reservoir (not shown).

The present invention will be more clearly understood from the following specific examples.

EXAMPLES 1-12

In each of Examples 1-12, a reduction reactor comprising a Pyrex ® glass tube having a length of about 10 centimeters and an inside diameter of about 2.4 centimeters and a quartz tube joined to the lower end of the aforesaid glass tube and having a length of about 1.2 meters and an inside diameter of about 2.7 centimeters, was employed. A packed bed of packing material was supported on a perforated alumina plate at about 8 centimeters from the bottom of the quartz tube. Substantially cylindrical quartz which had an outside diameter of about 4 millimeters, an inside diameter of about 2 millimeters and a length of about 8.9 millimeters, in amounts ranging between about 80 to about 240 grams, were employed as the packing material in Examples 1-12.

Initially to start a run, the packed bed in the reduction reactor was heated to the desired operating temperature by an external heater surrounding the portion of the reactor containing the packed bed. A stream of nitrogen was introduced downward into the reduction reactor and into the void space above the packed bed through an injection tube above the packed bed. When the temperature of the packed bed reached the desired level, the flow of nitrogen into the reactor was discontinued, and hydrogen was introduced through the same injection tube.

After a few minutes of hydrogen flow through the reactor, cuprous chloride was introduced through a separate injection tube above the packed bed downward into the void space within the reactor. In Examples 1-12, the cuprous chloride was fed into the reactor by a screw feeder; in Examples 1-9 the cuprous chloride was introduced in the form of a powder having a particle size distribution of about 72 weight percent in the range of 100 to 200 mesh size (U.S. Standard Sieve Series Nos.) about 17 weight percent in the range of 200 to 400 mesh size and about 9.4 weight percent greater than 400 mesh size; and in Examples 10-12 the cyprous choloride was introduced in the form of a powder having a particle size entirely in the range of 100 to 200 mesh size.

Coalesced liquid elemental copper metal dropping downward out of the packed bed is collected in the reactor vessel in a trap directly beneath the packed bed. Gas exiting from the packed bed was withdrawn from the reactor through a line located beneath the perforated plate and above the level of molten copper in the trap in the form of a stream comprising unreacted hydrogen and cuprous chloride, hydrogen chloride product, entrained uncoalesced molten elemental copper metal fines and vaporized impurities from the cuprous chloride feed. This gas stream was passed through a glass wood filter where the copper fines and condensed cuprous chloride were removed from the gas stream and collected and then through a scrubbing solution of deionized water where hydrogen chloride was removed from the stream.

Typically, a run continued for from 30 to 60 minutes, after which the reactor, filter and scrubber were disassembled and all of the products collected therein were analyzed for their copper and chloride concentrations, from which the extents of reduction and recovery and the mass balance for cuprous chloride were calculated.

The experimental parameters and results for Examples 1-12 are presented in Table 1. The trace composition of the cuprous chloride feed, the coalesced molten elemental copper, and trapped flue dust collected in Example 1 are presented in Table 2.

TABLE 1

| Experimental Parameters and Results | Example | | | |
|---|---|---|---|---|
| | 1 | 2 | 3 | 4 |
| CuCl Feed Rate[1] | 0.247 | 0.255 | 0.239 | 0.258 |
| H$_2$ Feed Rate[2] | 0.636 | 0.636 | 1.059 | 1.483 |
| H$_2$/CuCl Molar Ratio | 0.593 | 0.574 | 1.021 | 1.324 |
| H$_2$ Space Time[3] | 7.9 | 7.9 | 4.7 | 3.4 |
| CHSV | 178.1 | 184.0 | 172.0 | 186.1 |
| Bed Temperature[4] | 1,138 ± 2 | 1,138 ± 2 | 1,138 ± 2 | 1,138 ± 2 |
| Bed Length[5] | 6 | 6 | 6 | 6 |
| CuCl Mass Balance[6] | 98.4 | 97.9 | 93.5 | 96.7 |
| Reduction in Reactor[6] | 83.8 | 84.8 | 82.3 | 81.3 |
| Reduction in Off-Gas[6] | 11.7 | 8.9 | 10.0 | 13.0 |
| Overall Reduction[6] | 95.5 | 93.7 | 92.3 | 94.3 |

| Experimental Parameters and Results | Example | | | |
|---|---|---|---|---|
| | 5 | 6 | 7 | 8 |
| CuCl Feed Rate[1] | 0.221 | 0.094 | 0.147 | 0.343 |
| H$_2$ Feed Rate[2] | 0.636 | 0.636 | 0.636 | 2.542 |
| H$_2$/CuCl Molar Ratio | 0.662 | 1.560 | 0.994 | 1.709 |
| H$_2$ Space Time[3] | 7.9 | 7.9 | 7.9 | 5.9 |
| CHSV | 159.5 | 67.5 | 106.2 | 82.4 |
| Bed Temperature[4] | 1,097 ± 2 | 1,139 ± 2 | 1,135 ± 3 | 1,147 ± 8 |
| Bed Length[5] | 6 | 6 | 6 | 18 |
| CuCl Mass Balance[6] | 100.1 | 98.8 | 97.8 | 103.0 |
| Reduction in Reactor[6] | 85.2 | 86.7 | 85.4 | 95.5 |
| Reduction in Off-Gas[6] | 10.2 | 6.0 | 11.7 | 2.4 |
| Overall Reduction[6] | 95.4 | 92.7 | 97.1 | 97.9 |

| Experimental Parameters and Results | Example | | | |
|---|---|---|---|---|
| | 9 | 10 | 11 | 12 |
| CuCl Feed Rate[1] | 0.427 | 0.142 | 0.392 | 0.211 |
| H$_2$ Feed Rate[2] | 1.060 | 0.636 | 1.695 | 0.636 |
| H$_2$/CuCl Molar Ratio | 0.572 | 0.975 | 0.997 | 0.694 |
| H$_2$ Space Time[3] | 23.5 | 23.55 | 2.94 | 7.85 |
| CHSV | 102.6 | 34.2 | 282.4 | 152.3 |
| Bed Temperature[4] | 1,145 ± 5 | 1,145 ± 5 | 1,138 ± 1 | 1,100 ± 1 |
| Bed Length[5] | 18 | 18 | 6 | 6 |
| CuCl Mass Balance[6] | 98.0 | 98.9 | 100.1 | 99.6 |
| Reduction in Reactor[6] | 91.9 | 90.2 | 88.1 | 93.3 |
| Reduction in Off-Gas[6] | 5.7 | 8.1 | 9.8 | 4.6 |
| Overall Reduction[6] | 97.6 | 98.3 | 97.9 | 97.9 |

[1] pounds per hour
[2] cubic feet per hour
[3] seconds
[4] °C.
[5] inches
[6] weight percent

TABLE 2

| | Concentration (wppm) | | |
|---|---|---|---|
| Element | CuCl Feed | Cu Product | Flue Dust |
| Ag | 186 | 550 | 214 |
| As | 0 | 0.93 | 11.7 |
| Bi | 2.48 | 0.11 | 5.44 |
| Cd | 6.02 | 1.87 | 2.0 |
| Co | 1.81 | 1.0 | 5.0 |
| Cr | 0.98 | 0.59 | 9.0 |
| Fe | 233 | 4.39 | 200 |
| Mn | 0.86 | 0.39 | 9.0 |
| Ni | 2.19 | 0.56 | 23.5 |

TABLE 2-continued

| Element | Concentration (wppm) | | |
|---|---|---|---|
| | CuCl Feed | Cu Product | Flue Dust |
| Pb | 2.88 | 0.67 | 31.8 |
| Sb | 11.2 | 0.84 | 23.9 |
| Se | 0 | 0.47 | 24.3 |
| Si | 21.7 | 15.0 | 15.0 |
| Sn | 10.6 | 1.08 | 25.5 |
| Te | 9.8 | 1.3 | 2.3 |

In Table 1, "$H_2$ Space Time" refers to the residence time of hydrogen in the packed bed. "CHSV" is the cuprous chloride space velocity measured in pounds of cuprous chloride fed to the reactor per cubic foot of packed volume per hour. "Reduction in Reactor" refers to the percentage of the copper in the cuprous chloride feed that is recovered as elemental copper within the reactor, while "Reduction in Off-Gas" refers to the percentage of the copper in the cuprous chloride feed that is recovered as elemental copper downstream of the reactor. "Overall reduction" is the sum of "reduction in reactor" and "reduction in off-gas."

The results in Table 1 indicate that in all cases at least 90 weight percent of the copper in the cuprous chloride feed is converted and recovered as elemental copper within and downstream of the reactor. Furthermore at least 80 weight percent of the total amount of elemental copper recovered is recovered within the reactor.

The results in Table 1 also indicate that, other things being equal, the efficiency of promoting formation, coalescence and collection of elemental copper within the reactor is enhanced by increasing the length of the packed bed and by reducing the cuprous chloride space velocity. Increases in the packed bed length or decreases in the cuprous chloride space velocity or both permit the reaction mixture to remain within the packed bed longer so that reaction between the cuprous chloride and hydrogen and coalescence of the resulting elemental copper formed occur to a relatively larger extent.

The results in Table 2 indicate that the combined concentrations of all of the impurities, except silver and silicon, in the elemental copper product amounted to only about 15 parts per million by weight (w.p.p.m.) and that the entire concentration of impurities in the elemental copper product was only about 580 w.p.p.m. Although not shown in Table 2, the results of corresponding analyses for Examples 2-12 are essentially the same as those in Table 2. Thus, the use in the present method of temperatures of at least the melting point of the elemental metal formed permits the vaporization of volatile impurities present in the feed oxide or salt and production of a highly purified elemental metal product, without the necessity for additional refining steps.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A process for recovering a metal in its elemental state by reducing an oxide or salt of the metal with a reducing gas, comprising:
providing a reaction vessel containing a packed bed of a packing material which is substantially chemically inert under the conditions in the reaction vessel and whose melting point is higher than the temperature at which the packed bed is maintained, the packing material being packed so as to provide void spaces in the bed through which fluid flow of the oxide or salt, reducing gas and any elemental metal formed through the bed and in intimate contact with each other and with the packing material is permitted;
maintaining the temperature of the packed bed above the melting point of the metal in its elemental state and at a level at which substantial reduction of the metal in its oxide or salt occurs by reaction of the oxide or salt with the reducing gas;
introducing the metal oxide or salt and the reducing gas into the reaction vessel wherein the metal oxide or salt and reducing gas react to form the metal in its elemental state and passing a reaction mixture comprising the elemental metal formed, any gaseous product formed, any unreacted reducing gas and any unreacted fluid metal oxide or salt downward through the void spaces within the packed bed so as to effect intimate contact between the unreacted fluid metal oxide or salt, the unreacted reducing gas and the packed bed to thereby promote heat transfer therebetween and reaction of the unreacted fluid metal oxide or salt with the unreacted reducing gas, and so as to effect intimate contact of the elemental metal formed and the packed bed to thereby promote coalescence within the packed bed of the elemental metal formed;
permitting the reaction mixture to remain within the packed bed sufficiently long that reaction between the metal oxide or salt and the reducing gas and coalescence of the elemental metal formed are substantially complete by the time the reaction mixture passes out of the packed bed; and
collecting within the reaction vessel and below the packed bed any coalesced elemental metal passing out of the packed bed.

2. The process of claim 1 wherein the metal recovered in its elemental state from its oxide or salt is copper, antimony, bismuth, mercury, cobalt, lead, nickel, silver, tin, cadmium or sulfur.

3. The process of claim 2 wherein the metal recovered in its elemental state from its oxide or salt is copper.

4. The process of claim 3 wherein elemental copper is recovered from cupric oxide, cuprous oxide, cupric chloride, cuprous chloride, cupric oxychloride or cuprous oxychloride.

5. The process of claim 1 wherein at least sufficient reducing gas is introduced into the reaction vessel for the stoichiometric reduction of the metal in the oxide or salt to its elemental state.

6. The process of claim 1 wherein the reducing gas is hydrogen, methane, carbon monoxide or ammonia.

7. The process of claim 6 wherein the reducing gas is hydrogen.

8. The process of claim 1 wherein the packing material comprises quartz, ceramic materials, graphite, alumina or a refractory metal.

9. The process of claim 8 wherein the packing material is quartz.

10. The process of claim 3 wherein the packed bed is maintained at a temperature of at least 1083° C.

11. The process of claim 1 wherein the metal oxide or salt is introduced into the reaction vessel in its solid form.

12. The process of claim 1 wherein the metal oxide or salt is introduced into the reaction vessel in its liquid form.

13. The process of claim 1 wherein the metal oxide or salt is introduced into the reaction vessel in its gaseous form.

14. The process of claim 1 wherein the packing material is packed such that a void space exists between the packed bed and the top of the reaction vessel and at least one of the metal oxide or salt and reducing gas is introduced into the void space above the packed bed.

15. The process of claim 1 wherein the reaction between the metal oxide or salt and the reducing gas is at least 80 percent complete by the time the reaction mixture passes out of the packed bed.

16. The process of claim 1 wherein coalescence of the elemental metal is sufficiently complete that at least 80 percent of the elemental metal produced is collected in its liquid form within the reaction vessel.

17. The process of claim 1 or 3 wherein any unreacted metal oxide or salt, any unreacted reducing gas, any gaseous product and any uncoalesced elemental metal in the reaction mixture passing downward out of the packed bed are separated from the coalesced elemental metal and withdrawn from the reaction vessel.

18. The process of claim 1 or 3 wherein the metal oxide of salt introduced into the reaction vessel comprises impurities and any such impurities, and any products formed therefrom, present in the reaction mixture passing downward out of the packed bed are separated from the coalesced elemental metal and withdrawn from the reaction vessel.

19. The process of claim 1 or 18 wherein the coalesced elemental metal collected is substantially pure.

20. The process of claim 19 wherein the coalesced elemental metal collected is at least 99.9 percent pure.

* * * * *